Patented Aug. 25, 1925.

1,551,042

UNITED STATES PATENT OFFICE.

THOMAS W. MILLER, OF ASHLAND, OHIO.

METHOD OF VULCANIZING RUBBER.

No Drawing. Application filed November 29, 1924. Serial No. 752,951.

*To all whom it may concern:*

Be it known that I, THOMAS W. MILLER, a citizen of the United States, residing at Ashland, county of Ashland, State of Ohio, have invented certain new and useful Improvements in Methods of Vulcanizing Rubber (Case "H"), of which the following is a specification.

My invention relates to the vulcanization of rubber, and the like, and has for its object to provide a superior vulcanized article of high tensile strength and possessing good aging properties. My improved method also produces when desired an article of natural rubber color and transparency, analyzing 95 percent or more pure rubber, and also produces an article in colors, or compounded. It possesses immunity from prevulcanization, and free sulphur is practically eliminated from the vulcanized product. The vulcanizing process is characterized by extreme simplicity, and vulcanization can be accomplished at or below a temperature of 212° F. in a comparatively short time.

Before proceeding with a description of my vulcanizing process, it is desired to point out that in a rubber compound containing a metallic salt, preferably zinc oxide, in limited quantities and subjected to the action of an amine and carbon disulphide, the zinc oxide will dissolve and the rubber compound take on the appearance of a pure gum stock. Also, in the processes which follow, two different classes of accelerators, both old in the art, are employed, and which I will designate as accelerator "A", such as tetra-alkyl-thiuram-disulphide, or the reaction product of carbon disulphide and an amine; and as accelerator "B", such as ethylidine aniline, hexamethylenetetramine and others, which can be milled freely without danger of prevulcanization. Either class of accelerator will speed up the vulcanization of a stock containing zinc, class "A" at low temperatures and class "B" at temperatures above 250° F., but the combined action of the two will produce a quicker vulcanization at lower temperatures than either one alone will accomplish in quantities employed in my processes.

In carrying out my improved processes, I first prepare a rubber compound which may consist of (1) rubber and a metallic oxide; (2) rubber, a metallic oxide and sulphur; (3) rubber, a metallic oxide, sulphur and class "B" accelerator; (4) rubber, a metallic oxide, class "A" accelerator and class "B" accelerator. While I do not limit myself to the same, the following proportions have been found satisfactory:

(1) Rubber 98 parts, zinc oxide 2 parts.
(2) Rubber 96 parts, zinc oxide 2 parts, sulphur 2 parts.
(3) Rubber 95½ parts, zinc oxide 2 parts, sulphur 2 parts, class "B" accelerator ½ part.
(4) Rubber 97½ parts, zinc oxide 2 parts, class "A" accelerator ¼ part, class "B" accelerator ¼ part.

Either of the four compounds given may be milled and calendered in the usual manner, and if to be used for dipped goods, converted into a rubber cement by the addition of naptha or other solvents.

The four compounds previously described, or articles made therefrom, then are treated as follows:

For compound (1) I prepare a solution of naptha, carbon disulphide, sulphur, accelerator "A" and accelerator "B"; the following proportions have been found satisfactory; naptha 65 percent by volume, carbon disulphide 35 percent by volume, to which I add 2¾ ounces sulphur, 1⅖ ounces accelerator "A", and 1/10 ounce accelerator "B" to each gallon of naptha and carbon disulphide.

For compound (2) I prepare a solution of naptha, carbon disulphide, accelerator "B" and accelerator "A", in the same proportions as with the solution for compound "A".

For compound (3) I prepare a solution of naptha, carbon disulphide, and accelerator "A", in the same proportions as with the solution for compound "A".

For compound (4) I prepare a solution of naptha, carbon disulphide and sulphur, in the same proportions as with the solution for compound (1).

In solutions for compounds 1, 2, 3 and 4, naptha may be replaced in whole or in part by carbon tetrachloride, benzole, other solvents or acetone. The use of the carbon tetrachloride would reduce the fire hazard and permit using a smaller quantity of carbon disulphide but the same must be kept sufficiently high in volume completely to dissolve the sulphur in the solution for compounds 1 and 4, and to have a dissolving action on the sulphur when incorporated in the compounds, as in compounds 2 and 3.

The articles or product made from compounds 1, 2, 3 and 4 then are treated by immersing in the designated solutions, or in case of sheet or flat articles, are placed on a saturated belt for a sufficient length of time for the solution to penetrate, usually from 20 seconds to one minute depending upon the thickness of the article, and after being allowed to dry thoroughly, vulcanization is completed by subjecting to heat, either wet or dry. It has been found that vulcanization can be effected in from 20 to 40 minutes, at a temperature not exceeding 212° F., and can be accomplished in a longer time at room temperature.

What I claim is:

1. The method of vulcanizing a rubber compound or article containing rubber and a metallic oxide, which consists in subjecting said compound or article to the action of a solution such as naptha, to which has been added carbon disulphide and an accelerator of class "A" as described, the necessary sulphur and an accelerator of class "B" as described being added to the compound or solution as may be desired, and finally vulcanizing.

2. The method of vulcanizing a rubber compound or article containing rubber and a metallic oxide, which consists in subjecting said compound or article to the action of a solution such as naptha, to which has been added carbon disulphide and an accelerator of class "A" as described, the necessary sulphur and an accelerator of class "B" as described being added to the compound or solution as may be desired, and finally completing vulcanization by allowing the compound or article thoroughly to dry.

3. The method of vulcanizing a rubber compound or article containing rubber and a metallic oxide, which consists in subjecting said compound or article to the action of a solution such as naptha, to which has been added carbon disulphide and an accelerator of class "A" as described, the necessary sulphur and an accelerator of class "B" as described being added to the compound or solution as may be desired, and finally completing vulcanization by allowing the compound or article thoroughly to dry, and then exposing to the action of heat.

4. The method of vulcanizing a rubber compound or article containing rubber and a metallic oxide, which consists in subjecting said compound or article to the action of a solution such as naptha, to which has been added carbon disulphide, sulphur, an accelerator of class "A" as described, and an accelerator of class "B" as described, and finally completing vulcanization of the compound or article so treated.

5. The method of vulcanizing a rubber compound or article containing rubber and a metallic oxide, which consists in subjecting said compound or article to the action of a solution such as naptha, to which has been added carbon disulphide, sulphur, an accelerator of class "B" as described, and an amine which with the carbon disulphide will form a reaction product or an accelerator of class "A" as described, and finally completing vulcanization of the compound or article so treated.

6. The method of vulcanizing a rubber compound or article containing rubber and a metallic oxide, which consists in subjecting said compound or article to the action of a solution such as naptha, to which has been added carbon disulphide, sulphur, an accelerator of class "A" as described, and an accelerator of class "B" as described, for a sufficient length of time for the solution thoroughly to penetrate the compound or article, and finally completing vulcanization.

7. The method of vulcanizing a rubber compound or article containing rubber and a metallic oxide, which consists in subjecting said compound or article to the action of a solution such as naptha, to which has been added carbon disulphide, sulphur, an accelerator of class "A" as described, and an accelerator of class "B" as described, and finally completing vulcanization by allowing the compound or article thoroughly to dry.

8. The method of vulcanizing a rubber compound or article containing rubber and a metallic oxide, which consists in subjecting said compound or article to the action of a solution such as naptha, to which has been added carbon disulphide, sulphur, an accelerator of class "A" as described, and an accelerator of class "B" as described, and finally completing vulcanization by allowing the compound or article first thoroughly to dry, and then exposing to the action of heat.

9. The method of vulcanizing a rubber compound or article containing rubber, a metallic oxide and sulphur, which consists in subjecting said compound or article to the action of a solution such as naptha, to which has been added carbon disulphide, an accelerator of class "A" as described, and an accelerator of class "B" as described, and finally completing vulcanization of the compound or article so treated.

10. The method of vulcanizing a rubber compound or article containing rubber, a metallic oxide and sulphur, which consists in subjecting said compound or article to the action of a solution such as naptha, to which has been added carbon disulphide, an accelerator of class "B" as described, and an amine which with the carbon disulphide will form a reaction product or class "A" accelerator as described, and finally completing vulcanization of the compound or article so treated.

11. The method of vulcanizing a rubber compound or article containing rubber, a metallic oxide and sulphur, which consists in subjecting said compound or article to the action of a solution such as naptha, to which has been added carbon disulphide, an accelerator of class "A" as described, and an accelerator of class "B" as described, for a sufficient length of time for the solution thoroughly to penetrate the compound or article, and finally completing vulcanization.

12. The method of vulcanizing a rubber compound or article containing rubber, a metallic oxide and sulphur, which consists in subjecting said compound or article to the action of a solution such as naptha, to which has been added carbon disulphide, an accelerator of class "A" as described, and an accelerator of class "B" as described, and finally completing vulcanization by allowing the compound or article thoroughly to dry.

13. The method of vulcanizing a rubber compound or article containing rubber, a metallic oxide and sulphur, which consists in subjecting said compound or article to the action of a solution such as naptha, to which has been added carbon disulphide, an accelerator of class "A" as described, and an accelerator of class "B" as described, and finally completing vulcanization by allowing the compound or article first thoroughly to dry, and then exposing to the action of heat.

14. The method of vulcanizing a rubber compound or article containing rubber, a metallic oxide, sulphur and an accelerator of class "B" as described, which consists in subjecting said compound or article to the action of a solution such as naptha, to which has been added carbon disulphide, and an accelerator of class "A" as described, and finally completing vulcanization of the compound or article so treated.

15. The method of vulcanizing a rubber compound or article containing rubber, a metallic oxide, sulphur and an accelerator of class "B" as described, which consists in subjecting said compound or article to the action of a solution such as naptha, to which has been added carbon disulphide and an amine which with the carbon disulphide will form a reaction product or class "A" accelerator as described, and finally completing vulcanization of the compound or article so treated.

16. The method of vulcanizing a rubber compound or article containing rubber, a metallic oxide, sulphur, and an accelerator of class "B" as described, which consists in subjecting said compound or article to the action of a solution such as naptha, to which has been added carbon disulphide and an accelerator of class "A" as described, for a sufficient length of time for the solution thoroughly to penetrate the compound or article, and finally completing vulcanization.

17. The method of vulcanizing a rubber compound or article containing rubber, a metallic oxide, sulphur and an accelerator of class "B" as described, which consists in subjecting said compound or article to the action of a solution such as naptha, to which has been added carbon disulphide, and an accelerator of class "A" as described, and finally completing vulcanization by allowing the compound or article thoroughly to dry.

18. The method of vulcanizing a rubber compound or article containing rubber, a metallic oxide, sulphur and an accelerator of class "B" as described, which consists in subjecting said compound or article to the action of a solution such as naptha, to which has been added carbon disulphide, and an accelerator of class "A" as described, and finally completing vulcanization by allowing the compound or article first thoroughly to dry, and then exposing to the action of heat.

19. The method of vulcanizing a rubber compound or article containing rubber, a metallic oxide, an accelerator of class "A" as described, and an accelerator of class "B" as described, which consists in subjecting said compound or article to the action of a solution such as naptha, to which has been added carbon disulphide and sulphur, and finally completing vulcanization of the compound or article so treated.

20. The method of vulcanizing a rubber compound or article containing rubber, a metallic oxide, an accelerator of class "A" as described, and an accelerator of class "B" as described, which consists in subjecting said compound or article to the action of a solution such as naptha, to which has been added carbon disulphide and sulphur, for a sufficient length of time for the solution thoroughly to penetrate the compound or article, and finally completing vulcanization.

21. The method of vulcanizing a rubber compound or article containing rubber, a metallic oxide, an accelerator of class "A" as described, and an accelerator of class "B" as described, which consists in subjecting said compound or article to the action of a solution such as naptha, to which has been added carbon disulphide and sulphur, and finally completing vulcanization by allowing the compound or article thoroughly to dry.

22. The method of vulcanizing a rubber compound or article containing rubber, a metallic oxide, an accelerator of class "A" as described, and an accelerator of class "B" as described, which consists in subjecting said compound or article to the action of a solution such as naptha, to which has been added carbon disulphide and sulphur, and finally completing vulcanization by allowing the compound or article first thoroughly to dry, and then exposing to the action of heat.

In testimony whereof I hereunto affix my signature.

THOMAS W. MILLER.